(No Model.)
S. F. WEAVER.
HORSE HAY RAKE.
No. 292,520. Patented Jan. 29, 1884.
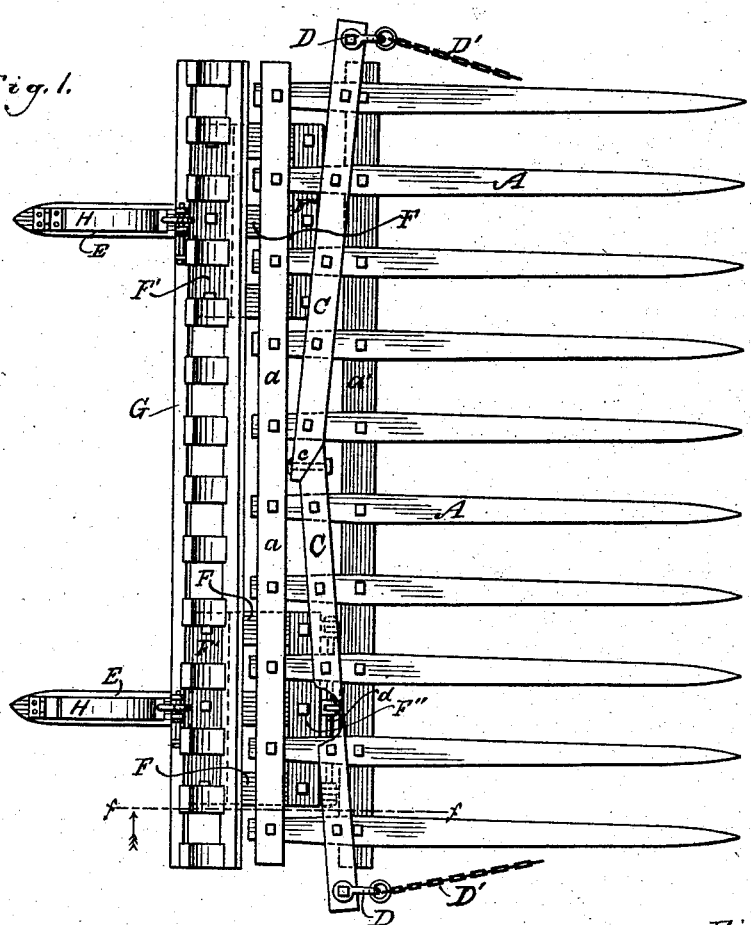
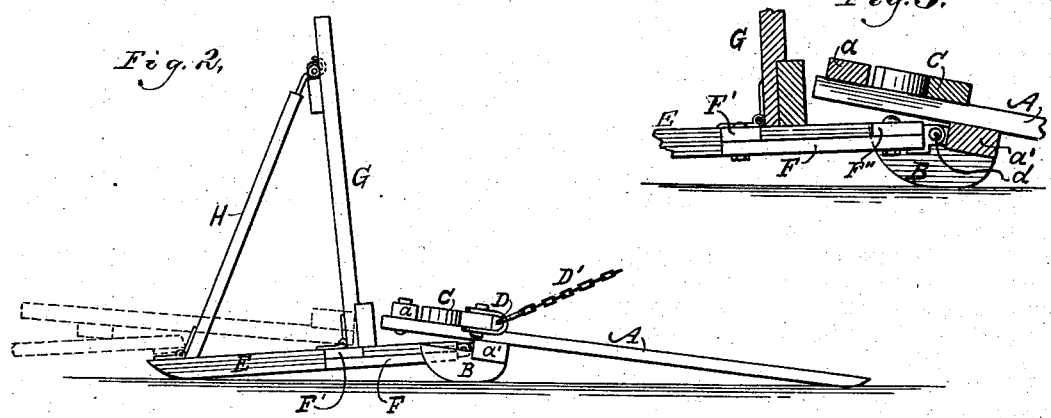
Witnesses.
Inventor.
Solomon F. Weaver
per F. F. Warner
his Attorney.

UNITED STATES PATENT OFFICE.

SOLOMON F. WEAVER, OF PORTIS, KANSAS.

HORSE HAY-RAKE.

SPECIFICATION forming part of Letters Patent No. 292,520, dated January 29, 1884.

Application filed May 9, 1883. (No model.)

*To all whom it may concern:*

Be it known that I, SOLOMON F. WEAVER, of Portis, in the county of Osborne and State of Kansas, have invented certain new and useful Improvements in Hay-Rakes, of which the following, in connection with the accompanying drawings, is a specification.

In the drawings, Figure 1 is a top or plan view of a rake embodying my invention. Fig. 2 is an end view thereof, and Fig. 3 is a section in the plane of the line $x$ $x$ of Fig. 1.

Like letters of reference indicate like parts.

My invention relates to that class of rakes chiefly intended for drawing windrowed hay into bunches to be put into cocks or stacks; and it consists in certain novel features of construction, substantially such as are hereinafter set forth in my claims.

A A represent the rake-teeth, the rear parts of which are bolted or otherwise securely fastened to cross-bars $a$ and $a'$, one arranged above and the other below the said teeth, as shown.

B B are runners, rigidly attached to the under faces of the cross-bar $a'$, and having curvilineal lower edges or bearing-faces.

C C are cross bars or braces rigidly attached to the upper faces of the rear portions of the rake-teeth. These braces do not extend in a straight line across the rake-teeth, but are inclined or arranged diagonally, as shown, and they meet at their inner ends and are there bolted together, as shown at $c$, thus performing the function of trusses to some extent, and preventing the rake-teeth from turning on their bolts when subjected to lateral strain.

D D are clevises, and D' D' are draft-chains, to each of which I connect a double-tree, it being understood that the rake is principally intended to be drawn by two teams, or four horses abreast.

E E are long runners, hinged at their forward ends to the rear edge of the bar $a'$, so that the free ends of the said runners may rise and fall.

F F are short arms, also hinged at their front ends to the bar $a'$, and arranged one on each side of one of the runners E E.

F' is a cross-bar, to which the rear ends of the arms F F are rigidly attached, and which is rigidly attached to the runner, and F'' is a cross-bar rigidly attached to the front part of the arms F F. Both rear runners are braced in this manner.

G is an upright frame, hinged at its bottom to the cross-pieces F' F'', so as to be capable of being folded over horizontally rearward.

H H are braces hinged at their lower ends to the rear parts of the runners E E, so as to be capable of also being folded over rearward, and these braces are detachably connected at their upper ends to the upper part of the frame G.

It will be perceived from the foregoing description and from reference to the drawings that the hay gathered upon the rake-teeth, while the rake is in use, will move back to the frame G, and be by it prevented from leaving the rake. It will also be perceived that the pressure thus exerted against the frame G cannot tilt up the working ends of the rake-teeth, so as to render them inoperative, the said frame and its braces being supported on the runners E E. In pitching the hay directly from the rake, the frame G, if in the way or if obstructing the work, may be folded back horizontally by detaching the upper ends of the braces H H from the said frame, as indicated by the dotted lines in Fig. 2. In other respects the rake may be operated as rakes of this class are usually worked. In order that the rake may be transported compactly, I detach the rear runners and the parts applied thereto, by removing the bolts or pintles $d$ $d$, connecting the said parts to the cross-bar $a'$.

Having thus described my invention, what I claim as new, and desire to secure by Letters Patent, is—

The combination, with the rake-teeth, of the hinged rear runners, the folding or hinged frame G, and the braces H H, all arranged for operation together substantially as and for the purposes set forth.

SOLOMON F. WEAVER.

Witnesses:
F. F. WARNER,
T. B. HALPENNY.